(12) United States Patent
Wu et al.

(10) Patent No.: US 10,511,506 B2
(45) Date of Patent: Dec. 17, 2019

(54) METHOD AND DEVICE FOR MANAGING VIRTUALIZED NETWORK FUNCTION

(71) Applicant: ZTE Corporation, Shenzhen (CN)

(72) Inventors: Daoli Wu, Shenzhen (CN); Kang Chen, Shenzhen (CN); Zhengfa Shi, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 243 days.

(21) Appl. No.: 15/513,452

(22) PCT Filed: Jan. 22, 2015

(86) PCT No.: PCT/CN2015/071338
§ 371 (c)(1),
(2) Date: Mar. 22, 2017

(87) PCT Pub. No.: WO2015/131696
PCT Pub. Date: Sep. 11, 2015

(65) Prior Publication Data
US 2017/0302543 A1    Oct. 19, 2017

(30) Foreign Application Priority Data
Sep. 22, 2014   (CN) .......................... 2014 1 0487818

(51) Int. Cl.
*G06F 15/173* (2006.01)
*H04L 12/26* (2006.01)
*H04L 12/24* (2006.01)

(52) U.S. Cl.
CPC ............ *H04L 43/08* (2013.01); *H04L 41/044* (2013.01); *H04L 41/0695* (2013.01); *H04L 41/0803* (2013.01); *H04L 43/0817* (2013.01)

(58) Field of Classification Search
CPC ... H04L 43/08; H04L 41/044; H04L 41/0695; H04L 41/0803; H04L 43/0817
(Continued)

(56) References Cited

U.S. PATENT DOCUMENTS 6,609,213 B1 *  8/2003  Nguyen .............. G06F 11/2025
                                                709/223
8,141,075 B1 *  3/2012  Chawla ............... G06F 9/45558
                                                718/1

(Continued)

FOREIGN PATENT DOCUMENTS

| CN | 101183984 A | 5/2008 |
| CN | 102204187 A | 9/2011 |
| CN | 104050045 A | 9/2014 |

OTHER PUBLICATIONS

International Search Report for corresponding application No. PCT/CN2015/071338 filed on Jan. 22, 2015; dated Jul. 20, 2015.

*Primary Examiner* — Liang Che A Wang
*Assistant Examiner* — Kaylee J Huang
(74) *Attorney, Agent, or Firm* — Cantor Colburn LLP (57) ABSTRACT

Provided is a method for managing a virtualized network function, comprising: an NFVO initializes a VNFM pool according to configuration information of the VNFM pool, wherein the configuration information includes an initial number of VNFMs managed by the VNFM pool, a maximum number of VNFMs managed by the VNFM pool, and a maximum number of VNFs managed by each VNFM in the VNFM pool; and the NFVO monitors a status of each VNFM in the VNFM pool, and, when an invalid VNFM is monitored, the NFVO ascribes one or more VNFs managed by the invalid VNFM to one or more valid VNFMs in the VNFM pool.

12 Claims, 5 Drawing Sheets

(58) Field of Classification Search
USPC .................................. 709/224, 219, 223, 217
See application file for complete search history.

(56) References Cited

U.S. PATENT DOCUMENTS

| | | | |
|---|---|---|---|
| 2006/0195561 A1* | 8/2006 | Keane | H04L 41/5012 709/223 |
| 2006/0230407 A1* | 10/2006 | Rosu | G06F 9/5088 718/105 |
| 2010/0054132 A1 | 3/2010 | Mitsumori | |
| 2015/0180748 A1* | 6/2015 | Ding | H04L 41/046 709/224 |
| 2015/0372936 A1* | 12/2015 | Kasso | H04L 47/70 709/226 |

* cited by examiner

METHOD AND DEVICE FOR MANAGING VIRTUALIZED NETWORK FUNCTION

TECHNICAL FIELD

The disclosure relates to the field of communications, and in particular to a method and a device for managing a virtualized network function.

BACKGROUND

Network Function Virtualization (NFV) aims to enable many types of network equipment, by researching and developing a standard Information Technology (IT) virtualization technique, to be integrated into a mass of servers, switches and storage devices which meet industrial standards so that network functions can be performed in a series of software running on hardware of industry-standard server; the software herein may be installed or uninstalled as needed at different locations of hardware in the network, and no new hardware equipment needs to be installed.

Operators set up a Network Functions Virtualization Industry Specification Group (NFV ISG) in European Telecommunications Standard Institute (ETSI), which mainly aims, via widely adopting the standard IT virtualization technique and adopting industry-standard high-capacity servers, storage devices and switches for bearing various network software functions, for realizing software is flexibly loaded and configuration is deployed flexibly at different locations of a data centre, a network node, a user terminal and the like, thereby accelerating speed of network deployment and adjustment, reducing complexity of service deployment, improving unification, generalization, adaptability and the like of network equipment, and finally reducing the fixed assets input and operating costs of a network.

According to requirements of an ETSI NFV ISG specification, a set of automatic deployment specifications is defined in an NFV Management and Orchestration (NFV-MANO) domain to realize a flow and architecture of a set of virtualization application deployment. In this architecture, there are two function entities, namely, a Network Functions Virtualization Orchestrator (NFVO) and a Virtualized Network Function Manager (VNFM). The NFVO is responsible for managing and scheduling a Virtualized Network Function (VNF) and resources in an entire virtualization management platform; and the VNFM is responsible for managing a life period of a VNF.

Figure 1:
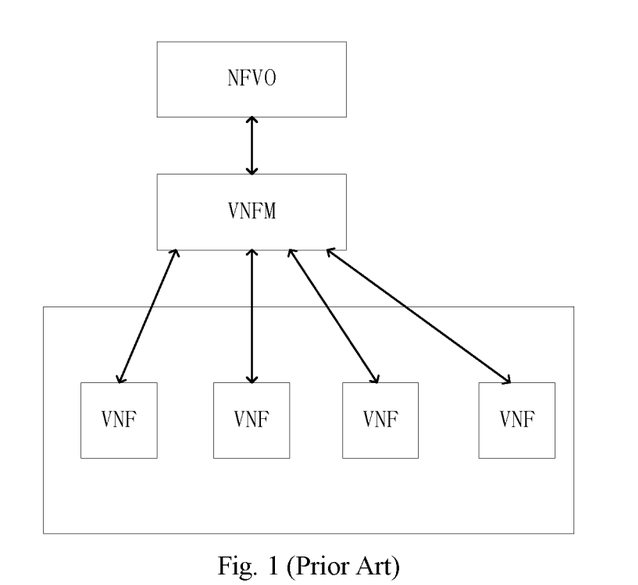
FIG. 1 is an NFVO/VNFM/VNF relationship diagram in an ETSI NFV ISG specification in related art.

The relationship among NFVO, VNFM and VNF is as shown in FIG. 1. The VNFM which is responsible for managing the life period of the VNF interacts with a plurality of VNFs in terms of network messages, and when telecommunication network equipment realizes NFV, the VNFM may be connected with a mass of VNFs, which puts forward a higher demand for processing performance of the VNFM. Further, the VNFM is a centralized manager of a virtualized sub-network to which the VNFM is ascribed; once the VNFM becomes invalid, the management of a virtualized network for all VNFs ascribed to the virtualized sub-network is invalid simultaneously.

To sum up, the VNFM function entity in the ETSI NFV ISG specification architecture cannot meet the requirements of high performance and high reliability for telecommunication network equipment.

SUMMARY

The technical problem to be solved by the disclosure is to provide a method and a device for managing virtualized network function so as to improve the performance and reliability of virtualized network function management.

In order to solve the above technical problem, a technical scheme is adopted as follows.

A method for managing virtualized network function management includes: initializing, by a NFVO, a VNFM pool according to configuration information of the VNFM pool, wherein the configuration information includes an initial number of VNFMs managed by the VNFM pool, a maximum number of VNFMs managed by the VNFM pool, and a maximum number of VNFs managed by each VNFM in the VNFM pool; and monitoring, by the NFVO, a status of each VNFM in the VNFM pool, and, when an invalid VNFM is monitored, ascribing, by the NFVO, one or more VNFs managed by the invalid VNFM to one or more valid VNFMs in the VNFM pool.

In an example embodiment, the maximum number of VNFs managed by each VNFM is the same; the method further includes: monitoring, by the NFVO, a status of the VNFM pool; searching, by the NFVO, for a VNFM which manages the fewest VNFs in the VNFM pool; when the number of VNFs managed by the VNFM which manages the fewest VNFs reaches the maximum number of VNFs managed by the VNFM, acquiring, by the NFVO, the number of VNFMs currently managed by the VNFM pool; when the number of VNFMs currently managed by the VNFM pool is less than the maximum number of VNFMs configured for the VNFM pool, adding, by the NFVO, a new VNFM into the VNFM pool.

In an example embodiment, the maximum number of VNFs managed by each VNFM is the same; the method further includes: monitoring, by the NFVO, the number of VNFMs managed by the VNFM pool; when the number of VNFMs currently managed by the VNFM pool is greater than the initial number of VNFMs managed by the VNFM pool, searching, by the NFVO, for a VNFM which manages the most VNFs in the VNFM pool; when the number of VNFs managed by the VNFM which manages the most VNFs is less than a half of the maximum number of VNFs managed by the VNFM, selecting, by the NFVO, a VNFM which manages the fewest VNFs in the VNFM pool as a VNFM to be deleted; performing, by the NFVO, following operations for each VNF managed by the VNFM to be deleted: finding out a VNFM which manages the fewest VNFs in all VNFMs excluding the VNFM to be deleted to serve as a deletion takeover VNFM for the VNF managed by the VNFM to be deleted, and ascribing the VNF to the deletion takeover VNFM; and after all VNFs managed by the VNFM to be deleted have been ascribed to one or more valid VNFMs, deleting, by the NFVO, the VNFM to be deleted.

In an example embodiment, initializing, by the NFVO, the VNFM pool according to the configuration information of the VNFM pool includes: performing, by the NFVO, instantiation on each VNFM in the VNFM pool according to the initial number of VNFMs managed by the VNFM pool, and adding, by the NFVO, the instantiated VNFM into the VNFM pool; after initializing the VNFM pool, the method further includes: ascribing, by the NFVO, one or more instantiated VNFs to one or more valid VNFMs.

In an example embodiment, monitoring, by the NFVO, the status of each VNFM in the VNFM pool, and, when the invalid VNFM is monitored, ascribing, by the NFVO, the one or more VNFs managed by the invalid VNFM to the one or more valid VNFMs in the VNFM pool, includes: monitoring, by the NFVO, the status of each VNFM in the VNFM pool, and, when the invalid VNFM is monitored, adding, by the NFVO, a new VNFM into the VNFM pool; performing, by the NFVO, following operations for each VNF managed by the invalid VNFM: finding out a VNFM which manages the fewest VNFs in all valid VNFMs to serve as an invalidation takeover VNFM for the VNF managed by the invalid VNFM, and ascribing the VNF to the invalidation takeover VNFM; and after all VNFs managed by the invalid VNFM have been ascribed to one or more valid VNFMs, deleting, by the NFVO, the invalid VNFM.

A device for managing virtualized network function, including a configuration component, a monitoring component and a processing component, wherein the configuration component is configured to initialize a VNFM pool according to configuration information of the VNFM pool, wherein the configuration information includes an initial number of VNFMs managed by the VNFM pool, a maximum number of VNFMs managed by the VNFM pool, and a maximum number of VNFs managed by each VNFM in the VNFM pool; the monitoring component is configured to monitor a status of each VNFM in the VNFM pool; and the processing component is configured to when an invalid VNFM is monitored, ascribe one or more VNFs managed by the invalid VNFM to one or more valid VNFMs in the VNFM pool.

In an example embodiment, the maximum number of VNFs managed by each VNFM is the same; the monitoring component is further configured to monitor a status of the VNFM pool; the processing component is further configured to search for a VNFM which manages the fewest VNFs in the VNFM pool; when the number of VNFs managed by the VNFM which manages the fewest VNFs reaches the maximum number of VNFs managed by the VNFM, acquire the number of VNFMs currently managed by the VNFM pool; when the number of VNFMs currently managed by the VNFM pool is less than the maximum number of VNFMs configured for the VNFM pool, add a new VNFM into the VNFM pool.

In an example embodiment, the maximum number of VNFs managed by each VNFM is the same; the monitoring component is further configured to monitor the number of VNFMs managed by the VNFM pool; the processing component is further configured to when the number of VNFMs currently managed by the VNFM pool acquired by the monitoring component is greater than the initial number of VNFMs managed by the VNFM pool, searching for a VNFM which manages the most VNFs in the VNFM pool; when the number of VNFs managed by the VNFM which manages the most VNFs is less than a half of the maximum number of VNFs managed by the VNFM, selecting a VNFM which manages the fewest VNFs in the VNFM pool as a VNFM to be deleted; the processing component is further configured to perform following operations for each VNF managed by the VNFM to be deleted: finding out a VNFM which manages the fewest VNFs in all VNFMs excluding the VNFM to be deleted to serve as a deletion takeover VNFM for the VNF managed by the VNFM to be deleted, and ascribing the VNF to the deletion takeover VNFM; and after all VNFs managed by the VNFM to be deleted have been ascribed to one or more valid VNFMs, delete the VNFM to be deleted.

In an example embodiment, the configuration component is configured to initialize the VNFM pool according to the configuration information of the VNFM pool by following ways: performing instantiation on each VNFM in the VNFM pool according to the initial number of VNFMs managed by the VNFM pool, and adding the instantiated VNFM into the VNFM pool; and the configuration component is further configured to after the configuration component initializes the VNFM pool, ascribe one or more instantiated VNFs to one or more valid VNFMs.

In an example embodiment, the processing component is configured to ascribe the one or more VNFs managed by the invalid VNFM to the one or more valid VNFMs in the VNFM pool by following ways: monitoring, by the monitoring component, the status of each VNFM in the VNFM pool, and, when the invalid VNFM is monitored, adding, by the processing component, a new VNFM into the VNFM pool; performing following operations for each VNF managed by the invalid VNFM: finding out a VNFM which manages the fewest VNFs in all valid VNFMs to serve as an invalidation takeover VNFM for the VNF managed by the invalid VNFM, and ascribing the VNF to the invalidation takeover VNFM; and after all VNFs managed by the invalid VNFM have been ascribed to one or more valid VNFMs, deleting the invalid VNFM.

A computer program includes a program instruction, which, when a computer performs the program instruction, makes the computer be able to perform the method for managing the virtualized network function described above.

A carrier which bears the computer program described above.

Through the VNFM pool in the above technical scheme, when a single VNFM is invalid, only the VNF ascribed to the VNFM is affected, and the VNF managed by the invalid VNFM is able to be migrated to other valid VNFMs automatically, thus the system reliability of virtualized networks is improved; management function for virtualized network function enables management for the VNF to be undertaken by each VNFM in the VNFM pool; meanwhile, according to the load processing status, the number of instance objects of a VNFM in the VNFM pool can be increased or reduced correspondingly, so that system resources are saved when the load is low and high-performance processing capabilities are met when the load is high.

DETAILED DESCRIPTION OF THE EMBODIMENTS

The disclosure is described below with reference to the drawings and the embodiments in detail. It is noted that the embodiments of the disclosure and the features of the embodiments can be combined with each other if there is no conflict.

Figure 2:
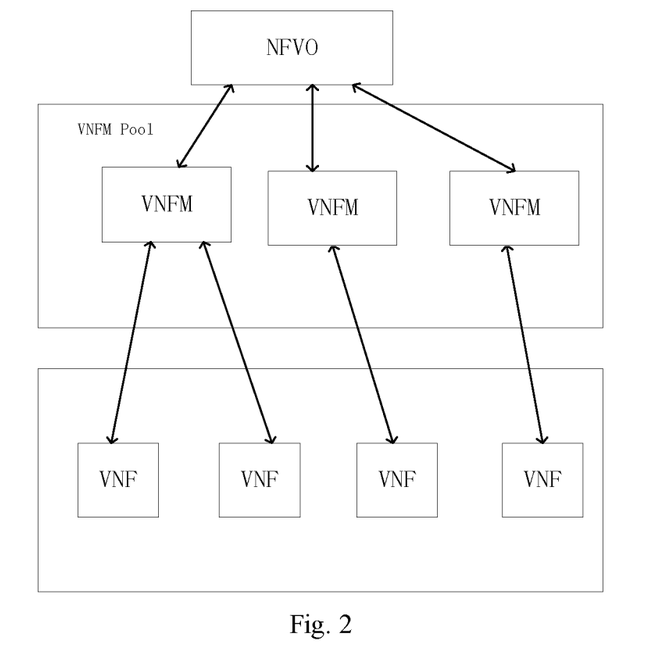
FIG. 2 is an NFVO/VNFM pool/VNF relationship diagram according to an embodiment of the disclosure.

In order to meet the requirements of high performance and high reliability for managing virtualized network function when telecommunication equipment realizes NFV, the embodiment of the disclosure realizes a method for managing virtualized network function by a VNFM pool. As shown in FIG. 2, the core idea is that a function entity of one VNFM pool including a plurality of VNFMs is utilized to realize the management function for a virtualized network function; management function of VNFs managed by the VNFM pool can be automatically allocated to a VNFM in the VNFM pool, so the management function of the VNFs can be performed by the VNFM; when a VNFM in the VNFM pool is invalid, the invalid VNFM is restored by way of creating an instance object of a new VNFM and deleting an instance object of the invalid VNFM, and one or more VNFs managed by the invalid VNFM are migrated to other valid VNFMs for management.

The embodiment of the present application provides a method for managing virtualized network function, the method includes:

Step 1: an NFVO initialize a VNFM pool according to configuration information of the VNFM pool, wherein the configuration information includes an initial number of VNFMs managed by the VNFM pool, a maximum number of VNFMs managed by the VNFM pool, and a maximum number of VNFs managed by each VNFM.

The maximum number of VNFMs managed by the VNFM pool is the number of VNFMs that the VNFM pool is able to manage at most, the maximum number of VNFs managed by the VNFM is the number of VNFs that the VNFM is able to manage at most.

The step that the NFVO initializes the VNFM pool according to the configuration information of the VNFM pool includes: the NFVO performs instantiation on each VNFM in the VNFM pool according to the initial number of VNFMs managed by the VNFM pool, and adds the instantiated VNFM into the VNFM pool. After the VNFM pool is initialized, one or more instantiated VNFs are ascribed to one or more valid VNFMs.

Step 2: the NFVO monitors a status of each VNFM in the VNFM pool, and, when an invalid VNFM is monitored, the NFVO ascribes one or more VNFs managed by the invalid VNFM to one or more valid VNFMs in the VNFM pool.

This step includes the following steps:

the NFVO monitors the status of each VNFM in the VNFM pool, and, when the invalid VNFM is monitored, the NFVO adds a new VNFM into the VNFM pool;

following operations are performed for each VNF managed by the valid VNFM: a VNFM which manages the fewest VNFs is found out in all valid VNFMs to serve as an invalidation takeover VNFM for the VNF managed by the invalid VNFM, and the VNF managed by the valid VNFM is ascribed to the invalidation takeover VNFM; and after all VNFs managed by the invalid VNFM have been ascribed to one or more valid VNFMs, the invalid VNFM is deleted.

Further, the method includes:

Step 3: the NFVO monitors a status of the VNFM pool; the maximum number of VNFs managed by each VNFM is the same; the NFVO searches for a VNFM which manages the fewest VNFs in the VNFM pool.

When the number of VNFs managed by the VNFM which manages the fewest VNFs reaches the maximum number of VNFs managed by the VNFM, the number of VNFMs currently managed by the VNFM pool is acquired; when the number of VNFMs currently managed by the VNFM pool is less than the maximum number of VNFMs configured for the VNFM pool, a new VNFM is added into the VNFM pool.

The purpose of the above operation is to monitor whether a VNFM needs to be added; for example, the maximum number of VNFs managed by the VNFM is 10; the VNFM pool manages 5 VNFMs; and when all the VNFMs manage 10 VNFs, the above monitoring condition is met.

It should be noted that the maximum number of VNFs managed by each VNFM also may be different. When the maximum number of VNFs managed by each VNFM is different, a corresponding specified rule may be utilized to determine when a new VNFM needs to be added according to the monitoring rule adopted in the condition that the maximum number of VNFs managed by each VNFM is the same.

Generally, after a new VNFM is added into the VNFM pool, the number of VNFs managed by the new VNFM is 0; at this time, when a new VNF needs to be added, the new instantiated VNF may be ascribed to the new VNFM. When there are other VNFMs which manage 0 VNF, the VNF may also be ascribed to the other VNFMs. In actual operations, the new VNF may be ascribed to the VNFM which currently manages the fewest VNFs; the VNFM to which the new VNF is ascribed may be selected according to other rules.

Step 4: the NFVO monitors the number of VNFMs managed by the VNFM pool; when the number of VNFMs currently managed by the VNFM pool is greater than the initial number of VNFMs managed by the VNFM pool, a VNFM which manages the most VNFs in the VNFM pool is searched for; when the number of VNFs managed by the VNFM which manages the most VNFs is less than a half of the maximum number of VNFs managed by the VNFM, a VNFM which manages the fewest VNFs in the VNFM pool is selected as a VNFM to be deleted.

Following operations are performed for each VNF managed by the VNFM to be deleted: a VNFM which manages the fewest VNFs in all VNFMs excluding the VNFM to be deleted is found out to serve as a deletion takeover VNFM for the VNF managed by the VNFM to be deleted, and the VNF is ascribed to the deletion takeover VNFM; and after all VNFs managed by the VNFM to be deleted have been ascribed to one or more valid VNFMs, the VNFM to be deleted is deleted.

It is noted that, when the one or more VNFs managed by the invalid VNFM is ascribed to other valid VNFMs or when the one or more VNFs managed by the VNFM to be deleted are ascribed to other valid VNFMs, the one or more VNFs to be transferred may be ascribed to one same VNFM, or may be ascribed to different VNFMs. Meanwhile, as for which VNFM the VNF to be transferred is ascribed to, a corresponding rule may be set according to actual conditions.

In addition, Step 3 and Step 4 are executed after step 1, and the sequential order between Step 3, Step 4 and Step 2 is not limited.

The implementation of the technical scheme of the disclosure is further described below in detail in conjunction with accompanying drawings and example embodiments.

Embodiment 1

Figure 3:
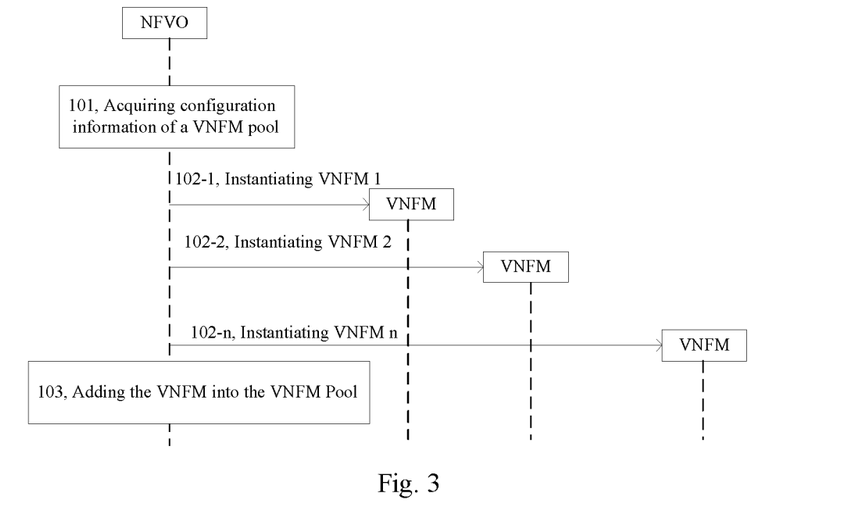
FIG. 3 is a flowchart of an NFVO initializing a VNFM pool according to the Embodiment 1 of the disclosure.

As shown in FIG. 3, an NFVO is responsible for initializing a VNFM pool; the process specifically includes the following steps:

Step 101: the NFVO acquires configuration information of the current VNFM pool, wherein the configuration information includes an initial number of VNFMs, a maximum number of VNFMs, a maximum number of VNFs managed by each VNFM and other VNFM pool configuration.

Step 102-1, Step 102-2, . . . , Step 102-$n$: the NFVO instantiates the instance object of the VNFM in the VNFM pool one by one until the number of instances of VNFMs in the VNFM pool reaches the initial number of VNFMs configured for the VNFM pool.

Step 103: the NFVO adds the instance object of instantiated VNFM into the VNFM list of the VNFM pool.

Embodiment 2

Figure 4:
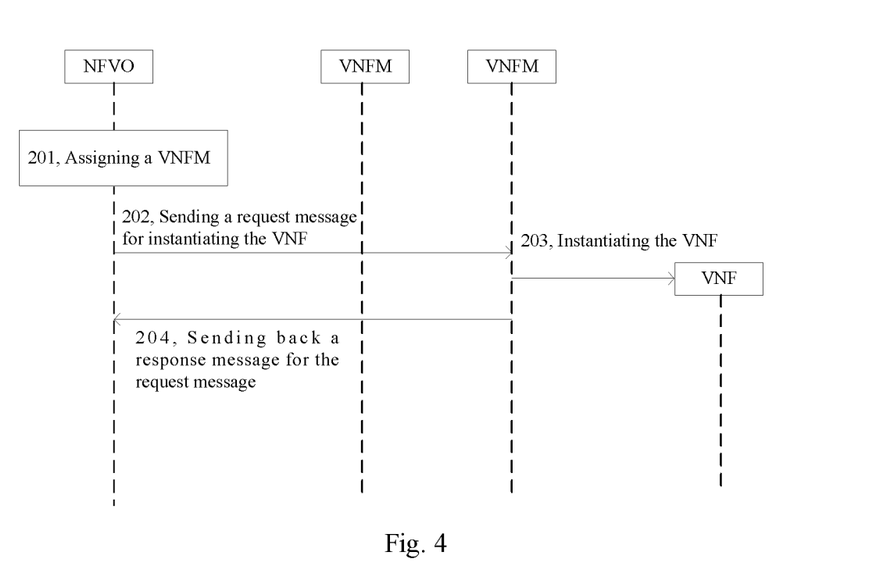
FIG. 4 is a flowchart of an NFVO instantiating a VNF according to the Embodiment 2 of the disclosure.

As shown in FIG. 4, the process of an NFVO instantiating a VNF specifically includes the following steps:

Step 201: the NFVO sorts VNFMs by the number of VNFs managed by the VNFMs in the VNFM pool, and assigns a VNFM which manages the fewest VNFs as a VNFM which performs instantiation on the VNF.

Step 202: the NFVO sends a request message for instantiating the VNF to the assigned VNFM.

Step 203: the assigned VNFM receives the request message and performs instantiation on the VNF, the VNFM to which the instantiated VNF is ascribed is the VNFM which performs the instantiation on the VNF, and the information of the VNFM to which the instantiated VNF is ascribed is saved in the attribute of instance object the VNF.

Step 204: the assigned VNFM sends back a response message for the request message.

Embodiment 3

Figure 5:
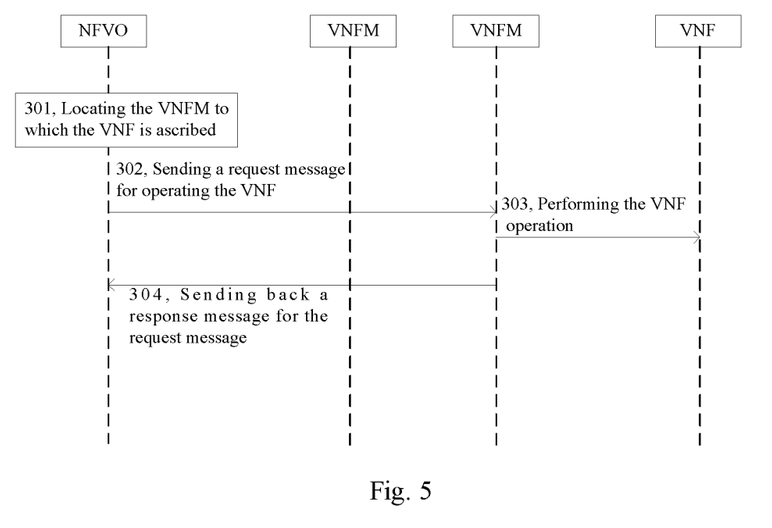
FIG. 5 is a flowchart of an NFVO operating a VNF according to the Embodiment 3 of the disclosure.

As shown in FIG. 5, the process of an NFVO operating a VNF specifically includes the following steps:

Step 301: the NFVO locates an instance object of a VNFM in a VNFM pool according to the attribute of the VNFM to which the VNF is ascribed.

Step 302: the NFVO sends a request message for operating the VNF to the VNFM to which the VNF is ascribed.

Step 303: the VNFM to which the VNF is ascribed receives the request message and performs the VNF operation as requested.

Step 304: the VNFM to which the VNF is ascribed sends back a response message for the request message.

Embodiment 4

Figure 6:
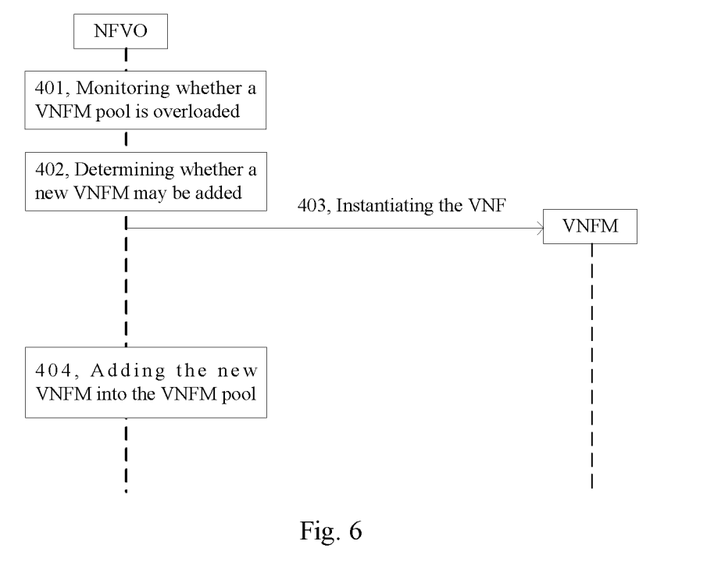
FIG. 6 is a flowchart of an NFVO adding a VNFM according to the Embodiment 4 of the disclosure.

As shown in FIG. 6, the process of an NFVO adding a VNFM specifically includes the following steps:

Step 401: the NFVO monitors whether a VNFM pool is overloaded; the specific way is as follows: VNFMs are sorted according to the number of VNFs managed by the VNFMs in the VNFM pool, when it is monitored that the number of VNFs of a VNFM which manages the fewest VNFs reaches the maximum number of VNFs managed by each VNFM configured for the VNFM pool, the following steps are performed; otherwise, the process is discontinued.

Step 402: the NFVO determines whether a new VNFM may be added; the specific way is as follows: the number of VNFMs of the current VNFM pool is acquired, and when the number of VNFMs of the current VNFM pool is less than the maximum number of VNFMs configured for the VNFM pool, the following steps are performed; otherwise, the process is discontinued.

Step 403: the NFVO creates a new instance object of a VNFM.

Step 404: the NFVO adds the new VNFM into the VNFM list of the VNFM pool.

Embodiment 5

Figure 7:
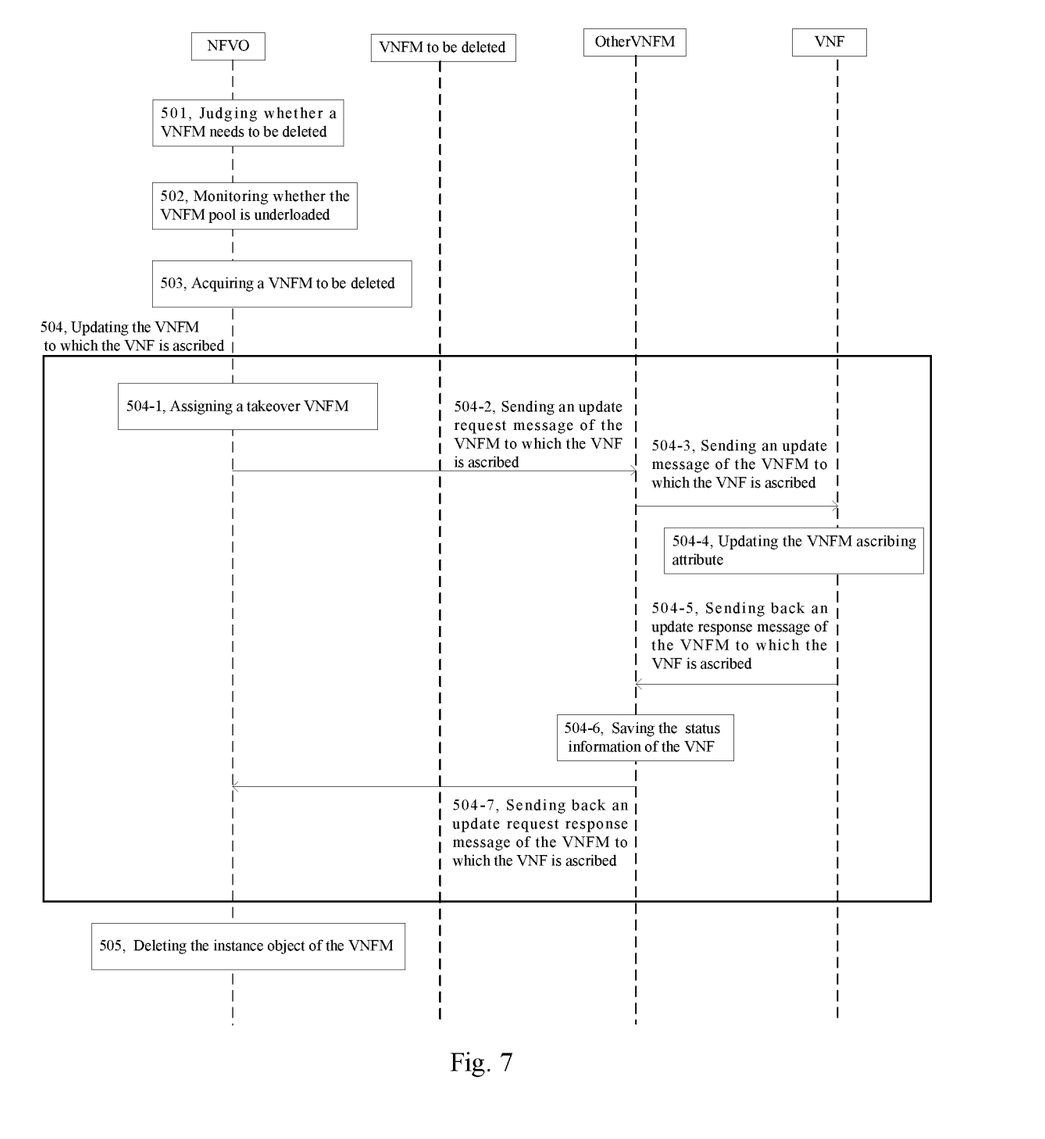
FIG. 7 is a flowchart of an NFVO deleting a VNFM according to the Embodiment 5 of the disclosure.

As shown in FIG. 7, the process of an NFVO deleting a VNFM specifically includes the following steps:

Step 501: the NFVO determines whether a VNFM needs to be deleted; the specific way is as follows: the number of VNFMs of the current VNFM pool is acquired, when the number of VNFMs of the current VNFM pool is greater than the initial number of VNFMs configured for the VNFM pool, the following steps are performed; otherwise, the process is discontinued.

Step 502: the NFVO monitors whether the VNFM pool is underloaded; the specific way is as follows: VNFMs are sorted according to the number of VNFs managed by the VNFMs in the VNFM pool, when it is monitored that the number of VNFs managed by the VNFM which manages the most VNFs is less than a half of the maximum number of VNFs managed by each VNFM configured for the VNFM pool, the following steps are performed; otherwise, the process is discontinued.

Step 503: the NFVO acquires a VNFM to be deleted; the specific way is as follows: VNFMs are sorted according to the number of VNFs managed by the VNFMs in the VNFM pool, and the VNFM which manages the fewest VNFs is selected as the VNFM to be deleted.

Step 504: the NFVO updates the VNFMs one by one by ascribing the VNFs managed by the VNFM to be deleted to other one or more VNFMs; the specific way includes the following sub-steps:

Step 504-1: the NFVO sorts the VNFMs excluding to the VNFM to be deleted in the VNFM pool according to the number of VNFs managed by the VNFMs, assigns a VNFM which manages the fewest VNFs as a VNFM used for taking over an instance of the VNF.

Step 504-2: the NFVO sends an update request message of the VNFM to which the VNF is ascribed to the VNFM used for taking over the instance of the VNF.

Step 504-3: the VNFM used for taking over the instance of the VNF receives the update request message, and sends an update message of the VNFM to which the VNF is ascribed to a corresponding VNF.

Step 504-4: the VNF receives the update message of the VNFM to which the VNF is ascribed and modifies its own VNFM ascribing attribute.

Step 504-5: the VNF sends back an update response message of the VNFM to which the VNF is ascribed, wherein the update response message of the VNFM to which the VNF is ascribed includes the current status information of the VNF.

Step 504-6: the VNFM receives the update response message of the VNFM to which the VNF is ascribed and saves the current status information of the VNF.

Step 504-7: the VNFM sends back an update request response message of the VNFM to which the VNF is ascribed to the NFVO.

Step 505: the NFVO deletes the VNFM from the VNFM list of the VNFM pool, and meanwhile deletes the instance object of the VNFM.

Embodiment 6

Figure 8:
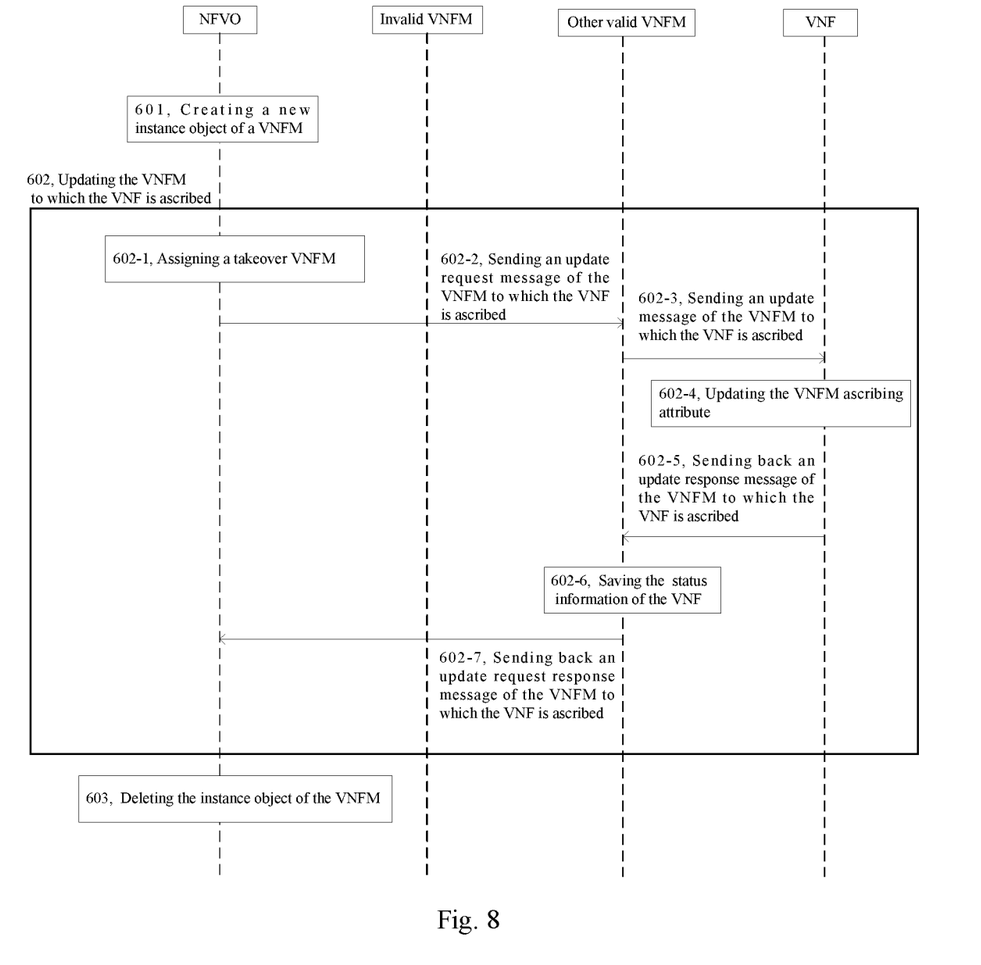
FIG. 8 is a flowchart for processing an invalid VNFM according to the Embodiment 6 of the disclosure.

As shown in FIG. 8, the processing for an invalid VNFM specifically includes the following steps:

Step 601: the NFVO creates a new instance object of a VNFM, and adds the instance object into the VNFM list of the VNFM pool.

Step 602: the NFVO updates VNFMs by ascribing VNFs managed by the invalid VNFM to other valid VNFMs, the specific way includes the following sub-steps:

Step 602-1: the NFVO sorts the VNFMs excluding to the invalid VNFM according to the number of VNFs managed by the VNFMs, assigns a VNFM which manages the fewest VNFs as a VNFM used for taking over an instance of the VNF.

Step 602-2: the NFVO sends an update request message for the VNFM to which the VNF is ascribed to the VNFM used for taking over the instance of the VNF.

Step 602-3: the VNFM used for taking over the instance of the VNF receives the update request message, and sends an update message of the VNFM to which the VNF is ascribed to a corresponding VNF.

Step 602-4: the VNF receives the update message of the VNFM to which the VNF is ascribed and modifies its own VNFM ascribing attribute.

Step 602-5: the VNF sends back an update response message of the VNFM to which the VNF is ascribed, wherein the update response message of the VNFM to which the VNF is ascribed includes the current status information of the VNF.

Step 602-6: the VNFM receives the update response message of the VNFM to which the VNF is ascribed and saves the current status information of the VNF.

Step 602-7: the VNFM sends back an update request response message of the VNFM to which the VNF is ascribed to the NFVO.

Step 603: the NFVO deletes the invalid VNFM from the VNFM list of the VNFM pool, and meanwhile deletes the instance object of the invalid VNFM.

The above are merely example embodiments of the disclosure which are not intended to limit the protection scope of the disclosure.

The embodiment of the disclosure further provides a device for managing a virtualized network function, which includes:

a configuration component configured to initialize a VNFM pool according to configuration information of the VNFM pool, wherein the configuration information includes an initial number of VNFMs managed by the VNFM pool, a maximum number of VNFMs, and a maximum number of VNFs managed by each VNFM;

a monitoring component configured to monitor the status of each VNFM in the VNFM pool; and a processing component configured to when an invalid VNFM is monitored, ascribe one or more VNFs managed by the invalid VNFM to one or more valid VNFMs in the VNFM pool.

In an example embodiment, the monitoring component is further configured to monitor the load status the VNFM pool; the processing component is further configured to when the monitoring component monitors that the VNFM pool is overloaded and determines according to the configuration information that a new VNFM can be added, add a new VNFM into the VNFM pool; and, when the monitoring component monitors that the VNFM pool is underloaded and determines according to the configuration information that a VNFM needs to be deleted, delete the VNFM in the VNFM pool.

In an example embodiment, the configuration component is configured to initialize the VNFM pool according to the configuration information of the VNFM pool by the following ways:

the NFVO performs instantiation on each VNFM in the VNFM pool according to the initial number of VNFMs managed by the VNFM pool, and adds the instantiated VNFM into the VNFM pool.

In an example embodiment, the processing component is configured to when an invalid VNFM is monitored by the monitoring component, ascribe the one or more VNFs managed by the invalid VNFM to the one ore more valid VNFMs by the following ways:

the NFVO monitors the status of each VNFM in the VNFM pool, and, when the invalid VNFM is monitored, the VNFM which manages the fewest VNFs in all valid VNFMs is selected as an invalidation takeover VNFM; and the VNF managed by the invalid VNFM is ascribed to the invalidation takeover VNFM and the invalid VNFM is deleted.

In an example embodiment, the processing component is configured to when the monitoring component monitors that the VNFM pool is overloaded and determines according to the configuration information that a new VNFM can be added, add a new VNFM into the VNFM pool by the following ways:

the VNFM which manages the fewest VNFs is searched for; when the number of VNFs managed by the VNFM which manages the fewest VNFs reaches the maximum number of VNFs managed by the VNFM, the VNFM pool is overloaded; and the number of VNFMs currently managed by the VNFM pool is acquired; when the number of VNFMs currently managed is less than the maximum number of VNFMs configured for the VNFM pool, a new VNFM is added into the VNFM pool.

The processing component is configured to, when the monitoring component monitors that the VNFM pool is underloaded and determines according to the configuration information that a VNFM needs to be deleted, delete the VNFM in the VNFM pool by the following ways:

the VNFM which manages the most VNFs is searched for; when the number of VNFs managed by the VNFM which manages the most VNFs is less than a half of the maximum number of VNFs managed by the VNFM, the VNFM pool is underloaded;

the VNFM which manages the fewest VNFs is selected as a VNFM to be deleted; a takeover VNFM is acquired in current state, and the VNF managed by the VNFM to be deleted is ascribed to the takeover VNFM.

Figure 9:
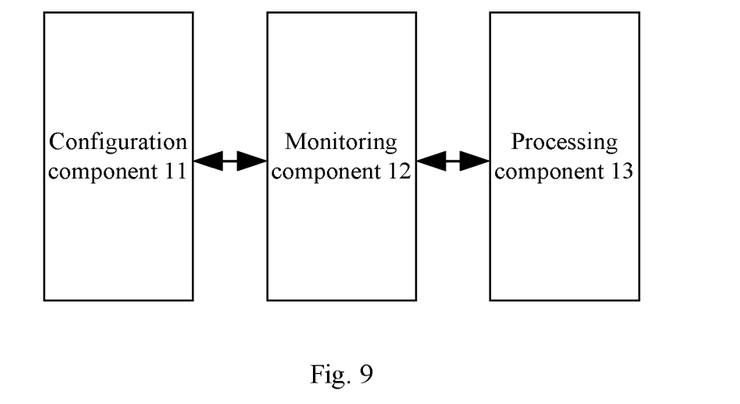
FIG. 9 is a structure schematic diagram of a device for managing virtualized network function according to an embodiment of the disclosure.

Meanwhile, as shown in FIG. 9, the embodiment of the disclosure further provides a device for managing a virtualized network function, and this device may be configured on an NFVO; the device includes:

a configuration component 11, configured to initialize a VNFM pool according to configuration information of the VNFM pool, wherein the configuration information includes an initial number of VNFMs managed by the VNFM pool, a maximum number of VNFMs managed by the VNFM pool, and a maximum number of VNFs managed by each VNFM;

a monitoring component 12, configured to monitor a status of each VNFM in the VNFM pool; and a processing component 13, configured to, when an invalid VNFM is monitored by the monitoring component 12, ascribe one or more VNFs managed by the invalid VNFM to one or more valid VNFMs in the VNFM pool.

In an example embodiment, the maximum number of VNFs managed by each VNFM is the same;

the monitoring component 12 is further configured to monitor a status of the VNFM pool;

the processing component 13 is further configured to search for a VNFM which manages the fewest VNFs in the VNFM pool; when the number of VNFs managed by the VNFM which manages the fewest VNFs reaches the maximum number of VNFs managed by the VNFM, acquire the number of VNFMs currently managed by the VNFM pool; when the number of VNFMs currently managed is less than the maximum number of VNFMs configured for the VNFM pool, add a new VNFM into the VNFM pool.

In an example embodiment, the monitoring component 12 is further configured to monitor the number of VNFMs managed by the VNFM pool;

the processing component 13 is further configured to when the number of VNFMs currently managed by the VNFM pool, which is acquired by the monitoring component, is greater than the initial number of VNFMs managed by the VNFM pool, search for a VNFM which manages the most VNFs; when the number of VNFs managed by the VNFM which manages the most VNFs is less than a half of the maximum number of VNFs managed by the VNFM, select a VNFM which manages the fewest number of VNFs as a VNFM to be deleted;

the processing component 13 is further configured to perform following operations for each VNF managed by the VNFM to be deleted: finding out a VNFM which manages the fewest VNFs in all VNFMs excluding the VNFM to be deleted to serve as a deletion takeover VNFM for the VNF managed by the VNFM to be deleted, and ascribing the VNF to the deletion takeover VNFM; the processing component 13 is further configured to after all VNFs managed by the VNFM to be deleted have been ascribed to one or more VNFMs, delete the VNFM to be deleted.

In an example embodiment, the configuration component 11 is configured to initialize the VNFM pool according to the configuration information of the VNFM pool by following ways: performing instantiation on each VNFM in the VNFM pool according to the initial number of VNFMs managed by the VNFM pool, and adding the instantiated VNFM to the VNFM pool;

The configuration component 11 is further configured to after the VNFM pool is initialized, ascribe one or more instantiated VNFs to one or more normal VNFMs.

In an example embodiment, the processing component 13 is configured to when the invalid VNFM is monitored by the monitoring component, ascribe the one or more VNFs managed by the invalid VNFM to the one or more VNFMs by following ways:

the NFVO monitors the status of each VNFM in the VNFM pool, and, when the invalid VNFM is monitored, a new VNFM is added into the VNFM pool;

following operations are performed for each VNF managed by the invalid VNFM: finding out a VNFM which manages the fewest VNFs in all valid VNFMs to serve as an invalidation takeover VNFM for the VNF managed by the invalid VNFM, and ascribing the VNF to the invalidation takeover VNFM; and after each VNF managed by the invalid VNFM is ascribed to other valid VNFMs, the invalid VNFM is deleted.

The embodiment of the disclosure further discloses a computer program, including a program instruction, which, when a computer performs the program instruction, makes the computer be able to perform any method for managing a virtualized network function described above.

The embodiment of the disclosure further discloses a carrier which bears the computer program described above.

Those skilled in the art may understand that all or part steps in the above method may be completed through a program instructing related hardware; the program may be stored in a computer readable storage medium, for example Read-Only Memory (ROM), disc or compact disc. Alternatively, all or part steps in the above embodiments may be implemented by one or more integrated circuits. Correspondingly, each component/components in the above embodiment may be realized in the form of hardware, or in the form of software function components. This application is not limited to any specific form of combinations of hardware and software.

The descriptions above are only the example embodiment of the disclosure, which are not used to restrict the disclosure. For those skilled in the art, the disclosure may have various changes and variations. Any amendments, equivalent substitutions, improvements, etc. within the principle of the disclosure are all included in the scope of the protection of the disclosure.

INDUSTRIAL APPLICABILITY

Through the VNFM pool in the above technical scheme, when a single VNFM is invalid, only the VNF ascribed to the VNFM is affected, and the VNF managed by the invalid VNFM is able to be migrated to other valid VNFMs automatically, thus the system reliability of virtualized networks is improved; management function for virtualized network function enables management for the VNF to be undertaken by each VNFM in the VNFM pool; meanwhile, according to the load processing status, the number of instance objects of a VNFM in the VNFM pool can be increased or reduced correspondingly, so that system resources are saved when the load is low and high-performance processing capabilities are met when the load is high. Thus, the disclosure is of very high industrial applicability.

What is claimed is:

1. A method for managing a virtualized network function, comprising:

initializing, by a Network Functions Virtualization Orchestrator (NFVO), a Virtualized Network Function Manager (VNFM) pool according to configuration information of the VNFM pool, wherein the configuration information comprises an initial number of VNFMs managed by the VNFM pool, a maximum number of VNFMs managed by the VNFM pool, and a maximum number of Virtualized Network Functions (VNFs) managed by each VNFM in the VNFM pool, the maximum number of VNFs managed by each VNFM is the same;

monitoring, by the NFVO, a status of each VNFM in the VNFM pool, and, when an invalid VNFM is monitored, ascribing, by the NFVO, one or more VNFs managed by the invalid VNFM to one or more valid VNFMs in the VNFM pool;

monitoring, by the NFVO, the number of VNFMs managed by the VNFM pool;

when the number of VNFMs currently managed by the VNFM pool is greater than the initial number of VNFMs managed by the VNFM pool, searching, by the NFVO, for a VNFM which manages the most VNFs in the VNFM pool; when the number of VNFs managed by the VNFM which manages the most VNFs is less than a half of the maximum number of VNFs managed by the VNFM which manages the most VNFs, selecting, by the NFVO, a VNFM which manages the fewest VNFs in the VNFM pool as a VNFM to be deleted;

performing, by the NFVO, following operations for each VNF managed by the VNFM to be deleted: finding out a VNFM which manages the fewest VNFs in all VNFMs excluding the VNFM to be deleted to serve as a deletion takeover VNFM for the VNF managed by the VNFM to be deleted, and ascribing the VNF to the deletion takeover VNFM; and after all VNFs managed by the VNFM to be deleted have been ascribed to the one or more valid VNFMs, deleting, by the NFVO, the VNFM to be deleted.

2. The method as claimed in claim 1, wherein the method further comprises:

monitoring, by the NFVO, a status of the VNFM pool;

searching, by the NFVO, for a VNFM which manages the fewest VNFs in the VNFM pool;

when the number of VNFs managed by the VNFM which manages the fewest VNFs reaches the maximum number of VNFs managed by the VNFM, acquiring, by the NFVO, the number of VNFMs currently managed by the VNFM pool; when the number of VNFMs currently managed by the VNFM pool is less than the maximum number of VNFMs configured for the VNFM pool, adding, by the NFVO, a new VNFM into the VNFM pool.

3. The method as claimed in claim 1, wherein initializing, by the NFVO, the VNFM pool according to the configuration information of the VNFM pool comprises:

performing, by the NFVO, instantiation on each VNFM in the VNFM pool according to the initial number of VNFMs managed by the VNFM pool, and adding, by the NFVO, the instantiated VNFM into the VNFM pool;

after initializing the VNFM pool, the method further comprises:

ascribing, by the NFVO, one or more instantiated VNFs to the one or more valid VNFMs.

4. The method as claimed in claim 3, wherein monitoring, by the NFVO, the status of each VNFM in the VNFM pool, and, when the invalid VNFM is monitored, ascribing, by the NFVO, the one or more VNFs managed by the invalid VNFM to the one or more valid VNFMs in the VNFM pool, comprises:

monitoring, by the NFVO, the status of each VNFM in the VNFM pool, and, when the invalid VNFM is monitored, adding, by the NFVO, a new VNFM into the VNFM pool;

performing, by the NFVO, following operations for each VNF managed by the invalid VNFM: finding out a VNFM which manages the fewest VNFs in all valid VNFMs to serve as an invalidation takeover VNFM for the VNF managed by the invalid VNFM, and ascribing the VNF to the invalidation takeover VNFM; and after all VNFs managed by the invalid VNFM have been ascribed to one or more valid VNFMs, deleting, by the NFVO, the invalid VNFM.

5. A device for managing a virtualized network function, comprising a memory and a hardware processor, wherein the hardware processor is configured to perform programming modules stored in the memory, the programming modules comprise:

a configuration component, configured to initialize a Virtualized Network Function Manager (VNFM) pool according to configuration information of the VNFM pool, wherein the configuration information comprises an initial number of VNFMs managed by the VNFM pool, a maximum number of VNFMs managed by the VNFM pool, and a maximum number of Virtualized Network Functions (VNFs) managed by each VNFM in the VNFM pool, the maximum number of VNFs managed by each VNFM is the same;

a monitoring component, configured to monitor a status of each VNFM in the VNFM pool;

a processing component, configured to when an invalid VNFM is monitored, ascribe one or more VNFs managed by the invalid VNFM to one or more valid VNFMs in the VNFM pool;

the monitoring component is further configured to monitor the number of VNFMs managed by the VNFM pool;

the processing component is further configured to when the number of VNFMs currently managed by the VNFM pool acquired by the monitoring component is greater than the initial number of VNFMs managed by the VNFM pool, searching for a VNFM which manages the most VNFs in the VNFM pool; when the number of VNFs managed by the VNFM which manages the most VNFs is less than a half of the maximum number of VNFs managed by the VNFM which manages the most VNFs, selecting a VNFM which manages the fewest VNFs in the VNFM pool as a VNFM to be deleted;

the processing component is further configured to perform following operations for each VNF managed by the VNFM to be deleted: finding out a VNFM which manages the fewest VNFs in all VNFMs excluding the VNFM to be deleted to serve as a deletion takeover VNFM for the VNF managed by the VNFM to be deleted, and ascribing the VNF to the deletion takeover VNFM; and after all VNFs managed by the VNFM to be deleted have been ascribed to the one or more valid VNFMs, delete the VNFM to be deleted.

6. The device as claimed in claim 5, wherein the monitoring component is further configured to monitor a status of the VNFM pool;

the processing component is further configured to search for a VNFM which manages the fewest VNFs in the VNFM pool; when the number of VNFs managed by the VNFM which manages the fewest VNFs reaches the maximum number of VNFs managed by the VNFM, acquire the number of VNFMs currently managed by the VNFM pool; when the number of VNFMs currently managed by the VNFM pool is less than the maximum number of VNFMs configured for the VNFM pool, add a new VNFM into the VNFM pool.

7. The device as claimed in claim 5, wherein the configuration component is configured to initialize the VNFM pool according to the configuration information of the VNFM pool by following ways: performing instantiation on each VNFM in the VNFM pool according to the initial number of VNFMs managed by the VNFM pool, and adding the instantiated VNFM into the VNFM pool; and the configuration component is further configured to after the configuration component initializes the VNFM pool, ascribe one or more instantiated VNFs to the one or more valid VNFMs.

8. The device as claimed in claim 7, wherein the processing component is further configured to ascribe the one or more VNFs managed by the invalid VNFM to the one or more valid VNFMs in the VNFM pool by following ways:

monitoring, by the monitoring component, the status of each VNFM in the VNFM pool, and, when the invalid VNFM is monitored, adding, by the processing component, a new VNFM into the VNFM pool;
performing following operations for each VNF managed by the invalid VNFM:
finding out a VNFM which manages the fewest VNFs in all valid VNFMs to serve as an invalidation takeover VNFM for the VNF managed by the invalid VNFM, and ascribing the VNF to the invalidation takeover VNFM; and
after all VNFs managed by the invalid VNFM have been ascribed to one or more valid VNFMs, deleting the invalid VNFM.

9. A non-transitory computer-readable storage medium, configured to store a computer program, the computer program comprises a program instruction, which, when a computer performs the program instruction, makes the computer be able to perform the method for managing the virtualized network function described in claim 1.

10. A non-transitory computer-readable storage medium, configured to store a computer program, the computer program comprises a program instruction, which, when a computer performs the program instruction, makes the computer be able to perform the method for managing the virtualized network function described in claim 2.

11. A non-transitory computer-readable storage medium, configured to store a computer program, the computer program comprises a program instruction, which, when a computer performs the program instruction, makes the computer be able to perform the method for managing the virtualized network function described in claim 3.

12. A non-transitory computer-readable storage medium, configured to store a computer program, the computer program comprises a program instruction, which, when a computer performs the program instruction, makes the computer be able to perform the method for managing the virtualized network function described in claim 4.

* * * * *